United States Patent
Arisawa et al.

(10) Patent No.: US 9,136,757 B2
(45) Date of Patent: Sep. 15, 2015

(54) POWER CONVERTER AND REFRIGERATING AND AIR-CONDITIONING APPARATUS

(75) Inventors: Koichi Arisawa, Tokyo (JP); Takuya Shimomugi, Tokyo (JP); Yosuke Shinomoto, Tokyo (JP); Masato Handa, Tokyo (JP); Mitsuo Kashima, Tokyo (JP); Shigeo Umehara, Tokyo (JP); Katsuhiko Saito, Tokyo (JP); Norikazu Ito, Tokyo (JP); Hitoshi Tanifuji, Tokyo (JP); Makoto Tanikawa, Tokyo (JP); Tomomi Higashikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/819,374

(22) PCT Filed: Nov. 4, 2010

(86) PCT No.: PCT/JP2010/006493
§ 371 (c)(1),
(2), (4) Date: Feb. 27, 2013

(87) PCT Pub. No.: WO2012/042579
PCT Pub. Date: Apr. 5, 2012

(65) Prior Publication Data
US 2013/0152624 A1   Jun. 20, 2013

(30) Foreign Application Priority Data
Sep. 27, 2010   (JP) .................................. 2010-214867

(51) Int. Cl.
G05F 1/577   (2006.01)
H02M 3/155  (2006.01)
(Continued)

(52) U.S. Cl.
CPC ............ *H02M 3/155* (2013.01); *H02M 1/4225* (2013.01); *H02M 1/44* (2013.01); *H02M 3/158* (2013.01); *H02M 2001/342* (2013.01); *Y02B 70/126* (2013.01); *Y02B 70/1491* (2013.01)

(58) Field of Classification Search
USPC .............. 323/138, 139, 267, 271; 363/15, 16, 363/24–26, 39, 44–46, 50, 52–54, 56.06, 363/65, 78–81, 89
See application file for complete search history.

(56) References Cited

U.S. PATENT DOCUMENTS 5,793,623 A * 8/1998 Kawashima et al. ...... 363/56.05
5,880,940 A * 3/1999 Poon ............................... 363/20
(Continued)

FOREIGN PATENT DOCUMENTS

CN   1121164 A   4/1996
CN   1574582 A   2/2005
(Continued)

OTHER PUBLICATIONS

International Search Report of the International Searching Authority mailed Jan. 18, 2011 for the corresponding international application No. PCT/JP2010/006493 (with English translation).
(Continued)

*Primary Examiner* — Adolf Berhane
*Assistant Examiner* — Gary Nash
(74) *Attorney, Agent, or Firm* — Posz Law Group, PLC

(57) ABSTRACT

A power converter includes step-up means for varying a voltage applied by a power supply to a predetermined voltage, commutating means for performing a commutation operation for allowing a current flowing through the step-up means to flow through a second path, smoothing means for smoothing a voltage related to outputs of the step-up means and the commutating means to produce power and supplying the power to a load side, and control means for performing control related to voltage varying, such as stepping up, by the step-up means and controlling the commutation operation of the commutating means on the basis of at least one of a voltage and a current related to the step-up means.

17 Claims, 11 Drawing Sheets

(51) Int. Cl.
  *H02M 1/42* (2007.01)
  *H02M 1/44* (2007.01)
  *H02M 3/158* (2006.01)
  *H02M 1/34* (2007.01)

(56) References Cited

U.S. PATENT DOCUMENTS

| | | | |
|---|---|---|---|
| 6,434,029 | B1* | 8/2002 | Cyr et al. .................. 363/86 |
| 6,798,672 | B2* | 9/2004 | Jinno ........................ 363/20 |
| 6,987,675 | B2* | 1/2006 | Jovanovic et al. ......... 363/21.01 |
| 7,012,381 | B2* | 3/2006 | Samejima et al. .......... 315/219 |
| 7,330,360 | B2* | 2/2008 | Lee et al. .................. 363/21.12 |
| 2005/0007036 | A1 | 1/2005 | Samejima et al. |
| 2005/0226012 | A1 | 10/2005 | Jovanovic et al. |
| 2008/0179623 | A1* | 7/2008 | Tachibana et al. ............ 257/103 |
| 2009/0219006 | A1* | 9/2009 | Gekinozu ................. 323/304 |

FOREIGN PATENT DOCUMENTS

| | | |
|---|---|---|
| CN | 1578091 A | 2/2005 |
| CN | 101232068 A | 7/2008 |
| EP | 0 695 024 A2 | 1/1996 |
| JP | 59-117459 A | 7/1984 |
| JP | 2005-160284 A | 6/2005 |
| JP | 2006-006061 A | 1/2006 |
| JP | 2006-067696 A | 3/2006 |
| JP | 2008-061403 A | 3/2008 |
| JP | 2010-166719 A | 7/2010 |

OTHER PUBLICATIONS

Japanese Office Action issued from the Japanese Patent Office dated Sep. 25, 2012 for the priority Japanese patent application No. 2010-214867 (with English translation).
Office Action mailed Feb. 10, 2014 issued in corresponding KR patent application No. 10-2013-7007030 (and English translation).
Jang et al., "A Study on the Modeling and Control method of PWM DC/DC Converter with Isolated two outputs." Daehan Electricity Academy Collection of Dissertations 1, Apr. 19-21, 2001. pp. 195-197 (and English abstract).
Dong-Yun et al., "A New PWM DC/DC Converter Topology with Multi-Output Using Single Secondary Winding." Daehan Electricity Academy Collection of Dissertations 2, Jul. 17-20, 2000. pp. 1339-1341 (and English abstract).
Hefner Jr. et al., "SiC Power Diodes Provide Breakthrough Performance for a Wide Range of Applications." IEEE Transactions on Power Electronics, vol. 16, No. 2, Mar. 2001. pp. 273-280.
Kim. "Book of Basic Design of Switching Power." Jan. 2002, Publisher: Seong-andang.
Office Action mailed Aug. 27, 2014 issued in corresponding KR patent application No. 10-2013-7007030 (and English translation).
Office Action dated Oct. 22, 2014 issued in corresponding CN patent application No. 201080069279.9 (and English translation).
Office Action dated Apr. 23, 2015 issued in corresponding CN patent application No. 201080069279.9 (and English translation).

* cited by examiner (a)

(b)

(c)

(d)

(a)

(b)

(a)

(b)

(c)

F I G. 8
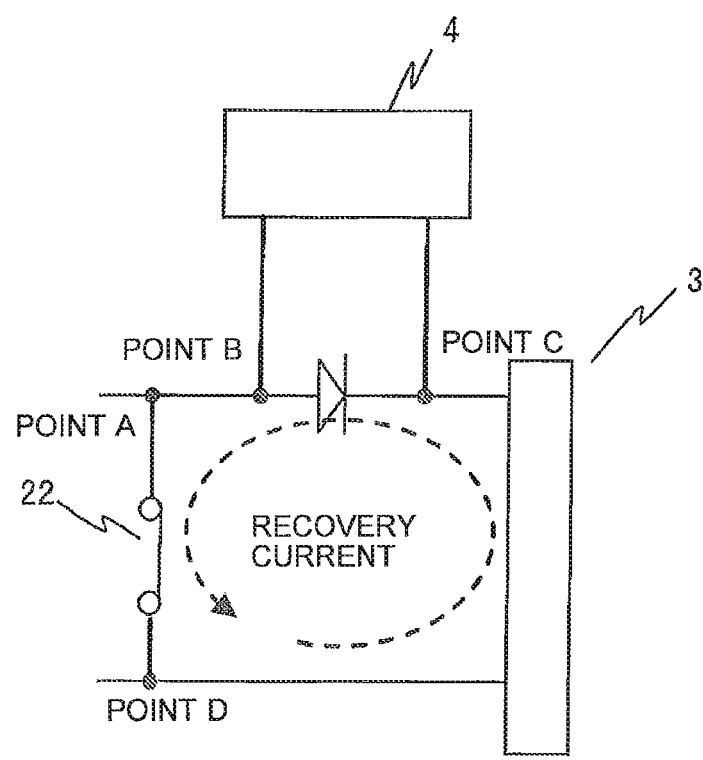

(a)

(b)

(c)

POWER CONVERTER AND REFRIGERATING AND AIR-CONDITIONING APPARATUS

CROSS REFERENCE TO RELATED APPLICATIONS

This application is a U.S. national stage application of PCT/JP2010/006493 filed on Nov. 4, 2010, and claims priority to, and incorporates by reference, Japanese Patent Application No. 2010-214867 filed on Sep. 27, 2010.

TECHNICAL FIELD

The present invention relates to a power converter and a refrigerating and air-conditioning apparatus.

BACKGROUND

The fields of application of various power converters have been developed with increasing practical applications of variable voltage variable frequency inverter units.

As regards the power converters, for example, the application and development of technology of step-up/down converters have been actively promoted in recent years. Meanwhile, wide band gap semiconductor devices including silicon carbide has also been actively developed. Some of such new devices have high voltage withstanding characteristics and small current capacities (allowable current effective values). These devices have been put into practical use mainly as rectifiers (refer to Patent Literature 1, for example).

CITATION LIST

Patent Literature

Patent Literature 1: Japanese Unexamined Patent Application Publication No. 2005-160284 (FIG. 1)

SUMMARY

Technical Problem

The practical application of new high-efficiency devices, for example, large-current-capacity devices faces many challenges in terms of high cost, crystal defects, and the like. It will therefore take some time before these devices become widespread. Accordingly, it is difficult under present circumstances to apply such a new device to a power converter for converting power whose level is higher than or equal to that of power supplied to, for example, a motor for a compressor of an air-conditioning apparatus in order to achieve high efficiency.

The present invention has been made in consideration of the above-described problem and an object of the present invention is to provide a power converter and the like capable of achieving high efficiency and high reliability.

Solution to Problem

The present invention provides a power converter including voltage varying means for varying an applied voltage to a predetermined voltage, commutating means for performing a commutation operation for allowing a current flowing through the voltage varying means to flow through a second path, current smoothing means for smoothing a voltage related to outputs of the voltage varying means and the commutating means to produce power and supplying the power to a load side, and control means for performing control related to voltage varying by the voltage varying means and controlling the commutation operation of the commutating means on the basis of at least one of a voltage and a current related to the voltage varying means.

In the power converter according to the present invention, since the commutating means capable of performing the commutation operation is provided, a current flowing through the voltage varying means can be commutated to the second path. Consequently, for example, during an operation of the voltage varying means, a current flowing from the smoothing means side to the voltage varying means side (power supply side) can be reduced, so that loss caused by such a current and conduction loss can be reduced, regardless of the current capacity of a device included in the voltage varying means, for example. Accordingly, since the commutation operation of the commutating means reduces loss, a system as a whole can achieve high efficiency.

Furthermore, a current flowing from the smoothing means side to the voltage varying means side is reduced, so that a noise terminal voltage level caused by current generation can be reduced. Advantageously, it is effective as EMC (Electro-Magnetic Compatibility: electro-magnetic compatibility) measures. In particular, a noise filter can be reduced in size, so that the cost can be reduced.

Furthermore, for example, arm short-circuit in a switching device included in the system may be avoided. Thus, the system can be designed with high reliability.

BRIEF DESCRIPTION OF DRAWINGS

FIG. 8 is a diagram illustrating an example of a recovery current generation path.

DETAILED DESCRIPTION

Power converters according to Embodiments of the present invention will be described below with reference to the drawings.

Embodiment 1

Figure 1:
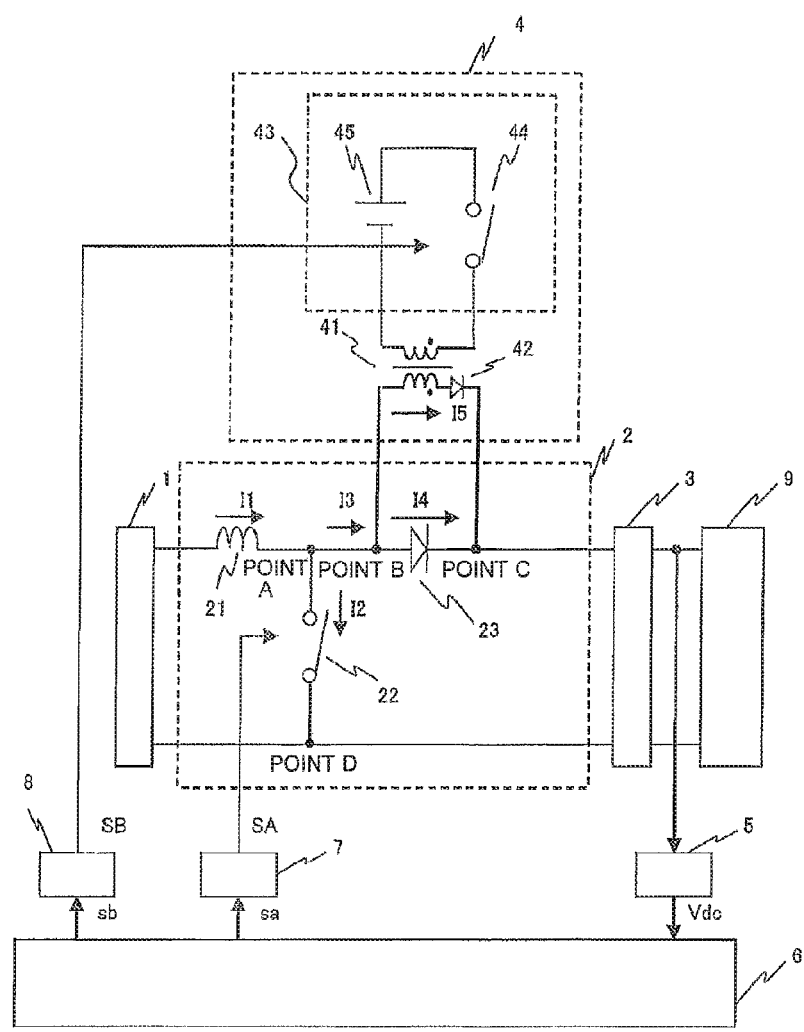
FIG. 1 is a diagram illustrating a system on which a power converter according to Embodiment 1 is centered.

FIG. 1 is a diagram illustrating the configuration of a system on which a power converter according to Embodiment 1 of the present invention is centered. First, the configuration of the system including the power converter capable of achieving high-efficiency power conversion in FIG. 1 will be described.

In the system of FIG. 1, the power converter is connected between a power supply 1 and a load 9. As the power supply 1, any of various power supplies, such as a direct-current power supply, a single-phase power supply, and a three-phase power supply, can be used. In the following description, it is assumed that the direct-current power supply is used. The load 9 is, for example, a motor or an inverter unit connected to a motor or the like.

The power converter includes step-up means 2 for increasing a voltage applied by the power supply 1 to a predetermined voltage, commutating means 4 for allowing a current flowing through the step-up means 2 to flow through a different path (second path) at necessary timing, and smoothing means 3 for smoothing a voltage (output voltage) related to operations of the step-up means 2 and the commutating means 4. In addition, the power converter includes voltage detecting means 5 for detecting the voltage obtained through the smoothing means 3, and control means 6 for controlling the step-up means 2 and the commutating means 4 on the basis of a voltage related to detection by the voltage detecting means 5. The power converter further includes driving signal transfer means 7 for converting a driving signal sa from the control means 6 into a driving signal SA suitable for the step-up means 2 and then transferring the resultant signal to the step-up means 2 and commutation signal transfer means 8 for converting a driving signal (commutation signal) sb from the control means 6 into a driving signal SB suitable for the commutating means 4 and then transferring the resultant signal to the commutating means 4.

In Embodiment 1, the step-up means 2 includes a reactor 21 connected to, for example, a positive terminal or a negative terminal of the power supply 1, a step-up switch 22 (power varying switch 22), and a step-up rectifier 23 (power varying rectifier 23) which are connected so as to follow the reactor 21. Referring to FIG. 1, a point B side of the step-up rectifier 23 is an anode side and a point C side thereof is a cathode side. For example, the step-up switch 22 including a switching device, such as a transistor, is opened or closed in accordance with the driving signal SA from the driving signal transfer means 7 to control conduction or non-conduction between the positive and negative terminals of the power supply 1 through the step-up switch 22. As the switching device, any semiconductor device capable of withstanding power supplied from the power supply 1, for example, a high-voltage withstanding device may be used. The step-up switch 22 is supplied with power for opening and closing operations from a switch operating power supply (not illustrated in FIG. 1). The step-up rectifier 23, which includes a p-n junction diode, rectifies a current (power) from the power supply 1 side to a current for the load 9 side. In Embodiment 1, it is assumed that the rectifier having a large current capacity is used in accordance with the magnitude of power supplied from the power supply 1 to the load 9. To reduce power (energy) loss in the step-up rectifier 23, rectifying is performed using a device with a low forward voltage (good Vf characteristics).

In Embodiment 1, the commutating means 4 includes a transformer 41, a commutation rectifier 42, and a transformer driving circuit 43 that drives the transformer 41. In FIG. 1, primary and secondary windings of the transformer 41 are of the same polarity. The second winding of the transformer 41 is connected in series with the rectifier 42. The commutation rectifier 42 is connected in parallel with the step-up rectifier 23 of the step-up means 2.

The transformer 41 and the transformer driving circuit 43 constitute commutation operation means. A voltage is applied to the primary winding, so that exciting current flows through the primary winding to produce current flowing through the secondary winding, thereby commutating the current flowing through the step-up means 2.

The commutation rectifier 42 rectifies a current related to commutation (current flowing through a second path). In this case, the commutation rectifier 42 is, for example, a semiconductor device that has excellent electrical characteristics (particularly, recovery characteristics), a small current capacity, and a short reverse recovery time. Since the commutation rectifier 42 is positioned on the power supply path from the power supply 1 to the load 9, it has to be a high voltage withstanding device. In this case, the commutation rectifier 42 includes a silicon Schottky barrier diode which is particularly excellent in recovery characteristics or a wide band gap semiconductor device which includes SiC (silicon carbide), GaN (gallium nitride, gallium nitride), or diamond.

The transformer driving circuit 43 includes a transformer power supply 45 for supplying power to the transformer 41 and a commutation switch 44. The commutation switch 44 including a switching device, such as a transistor, is opened or closed in accordance with the commutation signal SB from the commutation signal transfer means 8 to control or stop power supply from the transformer power supply 45 to the transformer 41 (the primary winding thereof). The transformer power supply 45 functions as a power supply that allows the commutating means 4 to perform a commutation operation. A voltage applied to the transformer 41 by the transformer power supply 45 is lower than a voltage (output voltage) applied through the step-up means 2 and the commutating means 4 to the smoothing means 3. Although not particularly illustrated in FIG. 1, a limiting resistor, a high-frequency capacitor, a snubber circuit, a protection circuit, or the like may be placed as necessary on a circuit path connecting the transformer power supply 45, the commutation switch 44, and the primary winding of the transformer 41 in consideration of, for example, measures against noise and circuit protection under fault conditions. Furthermore, the transformer power supply 45 may be used as the power supply for opening and closing the step-up switch 22.

Although the transformer 41 in FIG. 1 does not include a reset winding for resetting exciting current, the reset winding may be added to the primary winding as necessary and a rectifier or the like may be additionally disposed. Thus, exciting energy can be regenerated to the transformer power supply 45 side, thus achieving higher efficiency.

The smoothing means 3, which includes a smoothing capacitor, smoothes a voltage related to the operation of the step-up means 2 or the like and applies the resultant voltage to the load 9. The voltage detecting means 5 detects a voltage (output voltage Vdc) smoothed by the smoothing means 3. In this case, the voltage detecting means 5 includes a level shifting circuit including a voltage dividing resistor. Further, an analog-to-digital converter may be added as necessary in order to provide a signal (data) to be processed by the control means 6.

Figure 2:
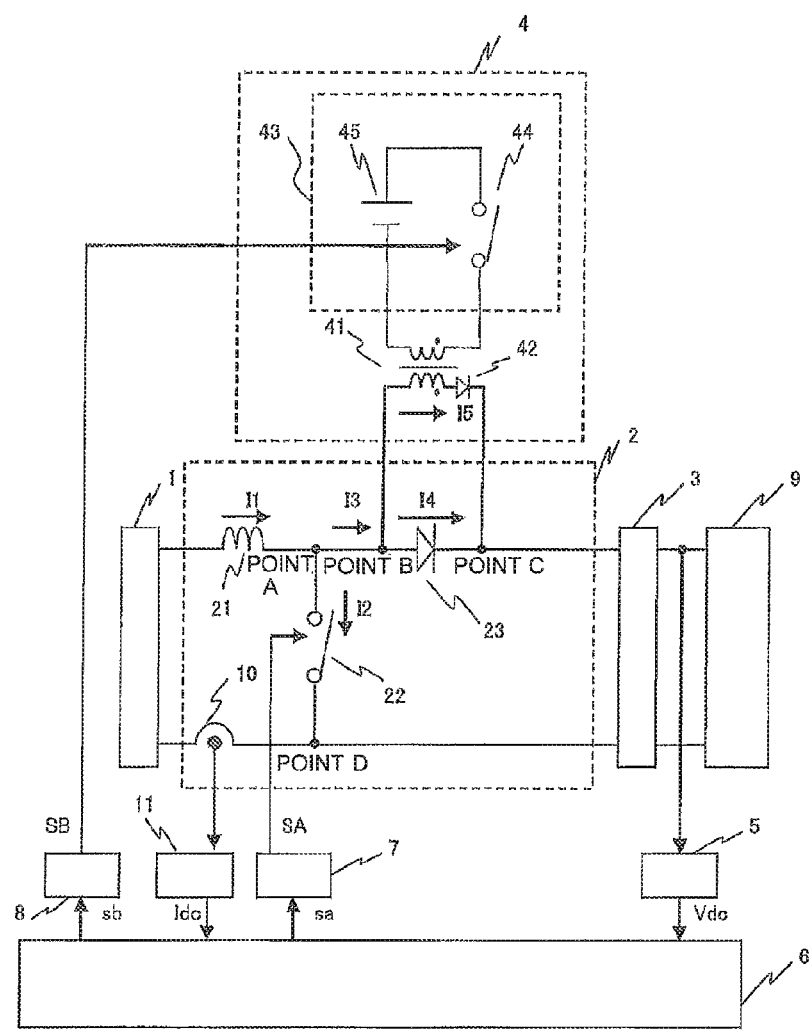
FIG. 2 is a diagram illustrating another example of a system on which a power converter is centered.

FIG. 2 is a diagram illustrating another example of the configuration of a system on which a power converter is centered. The power converter in FIG. 2 includes a current detecting device 10 and current detecting means 11. The current detecting device 10 is configured to detect a current between the power supply 1 and a connection point on a negative side of the step-up switch 22 and includes a current transformer or a shunt resistor.

The current detecting means 11 is configured to, when transmitting a signal indicative of a current related to detection by the current detecting device 10, convert the current into a signal having an appropriate value (Idc) that can be processed by the control means 6 and input the signal to the control means 6. Accordingly, the current detecting means 11 includes an amplifying circuit, a level shifting circuit, and a filtering circuit. If the control means 6 can execute a function of the current detecting means 11, the corresponding circuit or the like may be omitted appropriately.

Referring to FIG. 2, the control means 6 performs a process of generating driving signals on the basis of a voltage related to detection by the voltage detecting means 5 and a current related to detection by the current detecting device 10 and the current detecting means 11 and transmitting the driving signals. Although the power converter in FIG. 2 includes both the voltage detecting means 5 and the combination of the current detecting device 10 and the current detecting means 11, either of them may be placed and the control means 6 may perform a process of, for example, generating the driving signals on the basis of either the current or the voltage.

The control means 6 includes a microcomputer, an arithmetic unit, such as a digital signal processor, or a device having functions similar to those of the arithmetic unit. In Embodiment 1, the control means 6 generates signals indicative of instructions for operating the step-up switch 22 and the commutation switch 44 on the basis of, for example, a voltage related to detection by the voltage detecting means 5 and a current related to detection by the current detecting device 10 and the current detecting means 11, and controls the step-up means 2 and the commutating means 4. Although not illustrated in FIG. 1, the control means 6 is supplied with power for processing from a power supply for operating the control means. The transformer power supply 45 may be used as this power supply. Although it is assumed in Embodiment 1 that the control means 6 controls the operations of the step-up means 2 and the commutating means 4, Embodiment 1 is not limited to the assumption. For example, two control means may be arranged such that one control means controls the step-up means 2 and the other control means controls the commutating means 4.

The driving signal transfer means 7, which includes a buffer, a logic IC, and a level shifting circuit, converts the driving signal sa into the driving signal SA and transfers the signal SA to the step-up means 2. For example, if the control means 6 has functions of the driving signal transfer means 7, the driving signal transfer means 7 may be omitted appropriately. In this case, the control means 6 may convert the driving signal sa into the driving signal SA and transmits the signal to directly open or close the step-up switch 22. The commutation signal transfer means 8, which typically includes a buffer, a logic IC, and a level shifting circuit as with the driving signal transfer means 7, converts the commutation signal sb into the commutation signal SB and transfers the signal SB to the commutating means 4. If the control means 6 has functions of the commutation signal transfer means 8, the commutation signal transfer means 8 may be omitted appropriately. In this case, the control means 6 may convert the commutation signal sb into the commutation signal SB and transmits the signal to directly open or close the commutation switch 44. In the following description, it is assumed that the driving signal SA is the same as the driving signal sa from the control means 6 and the commutation signal SB is the same as the commutation signal sb (accordingly, the driving signal sa and the commutation signal sb will be used hereinafter).

An operation related to the system in, for example, FIG. 1 will be described below.

Figure 3:
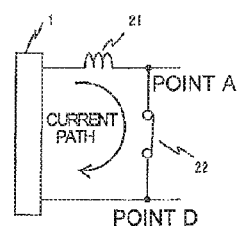
FIG. 3 includes diagrams illustrating exemplary operation modes of the system according to Embodiment 1.
Figure 3:
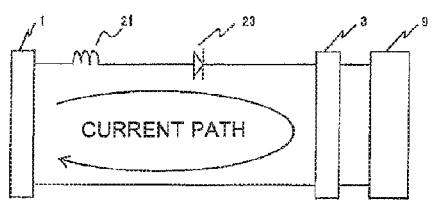
Figure 3:
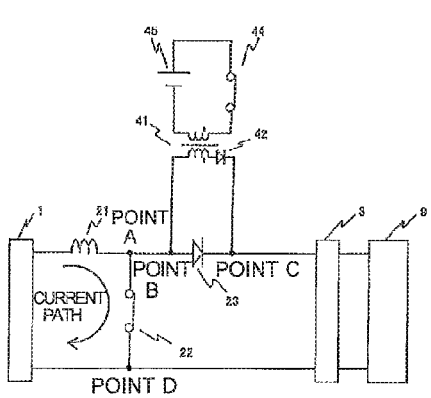
Figure 3:
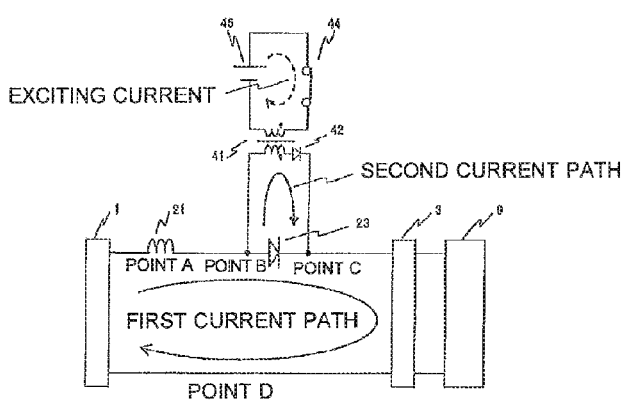

FIG. 3 includes diagrams illustrating exemplary operation modes of the system according to Embodiment 1. A power converting operation (step-up operation in Embodiment 1) of the power converter in this system is achieved by adding a commutation operation of a rectifier to an operation of a step-up chopper. Accordingly, there are four operation modes in total based on the combinations of open and closed states of the step-up switch 22 and the commutation switch 44.

First, it is assumed that the step-up switch 22 is ON (closed) and the commutation switch 44 is OFF (opened). Typically, the step-up rectifier 23 includes a device with a lower forward voltage than the commutation rectifier 42 having excellent recovery characteristics. Since the windings of the transformer 41 serve as inductor components, current does not flow through the windings when exciting current does not flow. In the case where the commutation switch 44 is OFF, therefore, current does not flow through a path (second path) in which the commutating means 4 is placed. Since the step-up switch 22 is ON, the positive terminal of the power supply 1 is electrically connected to the negative terminal thereof through a path illustrated in FIG. 3(*a*), so that current flows through the path (accordingly, current does not flow through a path via the step-up rectifier 23). Thus, energy can be accumulated in the reactor 21.

Subsequently, it is assumed that the step-up switch 22 is OFF and the commutation switch 44 is OFF. In this case, since the commutation switch 44 is OFF, current does not flow through the path in which the commutating means 4 is placed. In addition, since the step-up switch 22 is OFF, energy in the reactor 21 can be supplied via the smoothing means 3 to the load 9 through a path illustrated in FIG. 3(*b*) (i.e., the path via the step-up rectifier 23).

Furthermore, it is assumed that the step-up switch 22 is ON and the commutation switch 44 is ON. In this case, since the commutation switch 44 and the step-up switch 22 are in the ON state simultaneously and an impedance on the power supply 1 side is low, current hardly flows through the path in which the commutating means 4 is placed. Consequently, current flows through a path illustrated in FIG. 3(*c*), so that energy can be accumulated in the reactor 21. This operation mode is an operation mode that is not under control. Although this operation mode may be instantaneously caused due to, for example, transmission delay of the commutation signal SB, no problems in particular will occur when in use.

Then, it is assumed that the step-up switch 22 is OFF and the commutation switch 44 is ON. In this case, since the step-up switch 22 is OFF, current flows through the step-up rectifier 23 to the load 9 side (first current path). In addition, since the commutation switch 44 is ON, the transformer 41 is excited, so that current flows through the path (second current path) in which the commutating means 4 is placed, as illustrated in FIG. 3(*d*). After a lapse of a predetermined time in this state, the current is fully commutated, so that the current flows only through the path in which the commutating means 4 is placed.

In the above-described operation modes, although the commutation operation occurs while the step-up switch 22 is OFF and the commutation switch 44 is ON, the operation of accumulating energy into the reactor 21 by opening and closing the step-up switch 22 follows the step-up chopper. Accordingly, repeating of switching (opening and closing) such that the step-up switch 22 is ON during ON period $T_{on}$ and is OFF during OFF period $T_{off}$ allows a mean voltage $E_c$ given by the following Equation (1) to be applied to the point C, thus increasing a voltage. For the sake of simplicity, $E_1$ denotes a voltage of the power supply 1.

$$E_c = (T_{on} + T_{off}) \cdot E_1 / T_{off} \quad (1)$$

Figure 4:
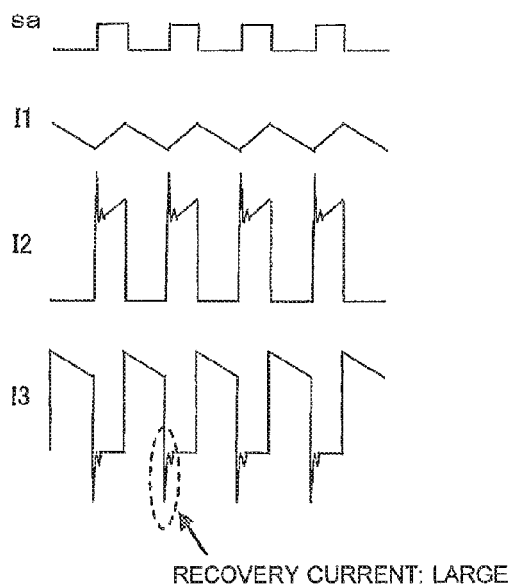
FIG. 4 is a diagram illustrating waveforms of a signal and currents in a case where commutating means 4 is not operated.

FIG. 4 illustrates waveforms of the driving signal sa and currents $I_1$ to $I_3$ flowing through the components in the case where the commutating means 4 is not operated (the commutation signal sb is not transmitted or an OFF signal is transmitted). It is assumed that the driving signal sa is a PWM signal and a direction to a high level is an active direction (turn-on direction). When the driving signal sa is turned on, the step-up switch 22 is turned on (closed). When the driving signal sa is turned off, the step-up switch 22 is turned off (opened).

The current $I_1$ denotes current flowing through the reactor 21. The current $I_2$ denotes current flowing through the step-up switch 22. The current $I_3$ denotes current flowing through the step-up rectifier 23. The illustrated examples of the current waveforms are obtained after a lapse of sufficient time, during which the ON period and the OFF period of the driving signal sa are controlled so that the load 9 and the output voltage Vdc are constant, from the time when the power supply 1 is turned on. The ratio (duty ratio) of the ON period to the OFF period of the driving signal sa is substantially constant.

Figure 5:
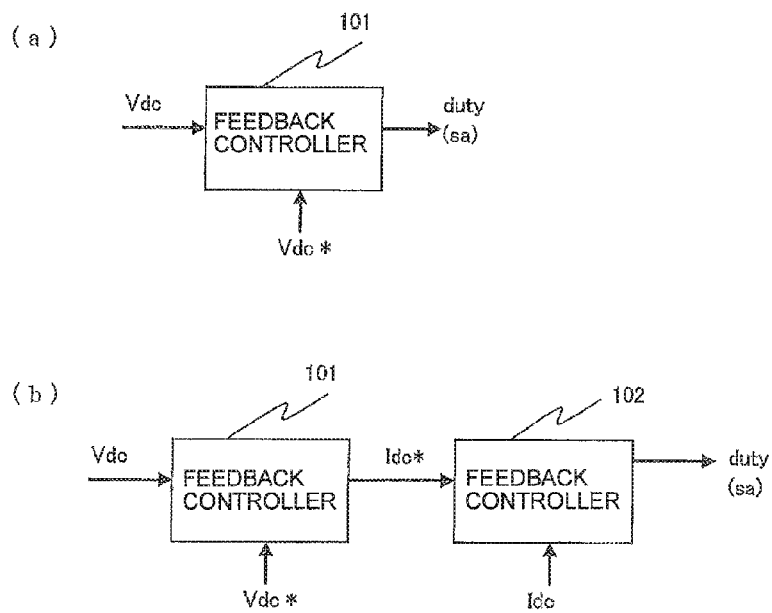
FIG. 5 includes diagrams explaining exemplary configurations of means for generating a reference signal for a driving signal sa.

FIG. 5 includes diagrams explaining examples of reference signal generation for generation of the driving signal sa by the control means 6. It is assumed that the control means 6 in Embodiment 1 includes a feedback controller 101 as illustrated in FIG. 5.

The feedback controller 101 performs, for example, proportional-integral control (PI control) on the basis of the actual output voltage Vdc obtained by detection through the voltage detecting means 5 and a set target voltage Vdc* (commanded value) to generate a reference signal ("duty" which will be simply referred to as a "reference signal") for generation of the driving signal sa.

In this case, feedback control is performed so that the actual output voltage Vdc approaches the target voltage Vdc*. The ON period of the driving signal sa is successively corrected and set in accordance with the reference signal, so that the ON period is reflected in the duty ratio of the driving signal sa. Thus, after a lapse of a predetermined time, the output voltage Vdc is substantially equal to the target voltage Vdc*, except for a steady-state error.

For practical use, the value of the target voltage Vdc* may be mapped in an internal memory, such as a storage unit, in the control means 6 and the value may be changed depending on the operating situation. Alternatively, the value may be stored in an external storage device outside the control means 6 and be read into the control means 6 and the control may be performed.

In the case where the current detecting device 10 and the current detecting means 11 are arranged to detect a current as illustrated in FIG. 2, a feedback controller 102 is connected so as to follow the feedback controller 101 as illustrated in, for example, FIG. 5(*b*).

The feedback controller 101 outputs a commanded current Idc* on the basis of the output voltage Vdc and the target voltage Vdc*.

The feedback controller 102 performs, for example, PI control on the basis of the commanded current Idc* and a detected current Idc related to detection by the current detecting device 10 and the current detecting means 11 to generate a reference signal. At this time, the control is performed so that the actual output current Idc approaches the target value Idc* and the ON period of the driving signal sa is successively corrected and set on the basis of the reference signal. In this case, after a lapse of a predetermined time, the values Vdc and Idc substantially reach the target values (except for steady-state errors).

For example, dead time in control has to be taken into consideration depending on use condition. Accordingly, the feedback controllers 101 and 102 may be allowed to perform PID control, which is the combination of proportional-integral control and derivative control, depending on circumstances.

As regards the commanded current Idc*, mapped data may be stored into, for example, the storage unit of the control means 6 and the value may be changed depending on the operating situation. Alternatively, the data may be stored in the external storage device outside the control means 6 and be read into the control means 6 and the control may be performed. Furthermore, the control may be performed using an alternative value, such as power, instead of current.

Figure 6:
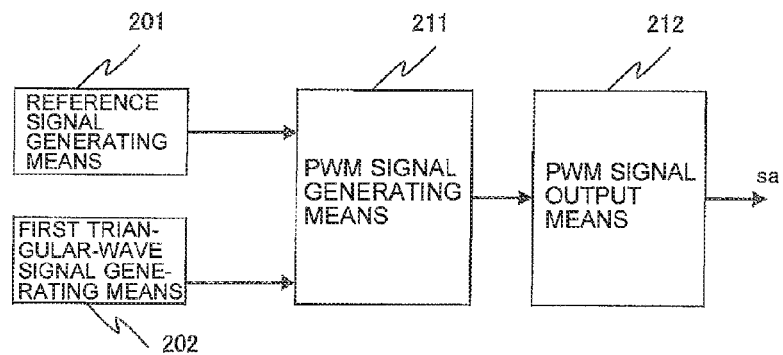
FIG. 6 includes diagrams explaining exemplary configurations of means for generating the driving signal sa, for example.
Figure 6:
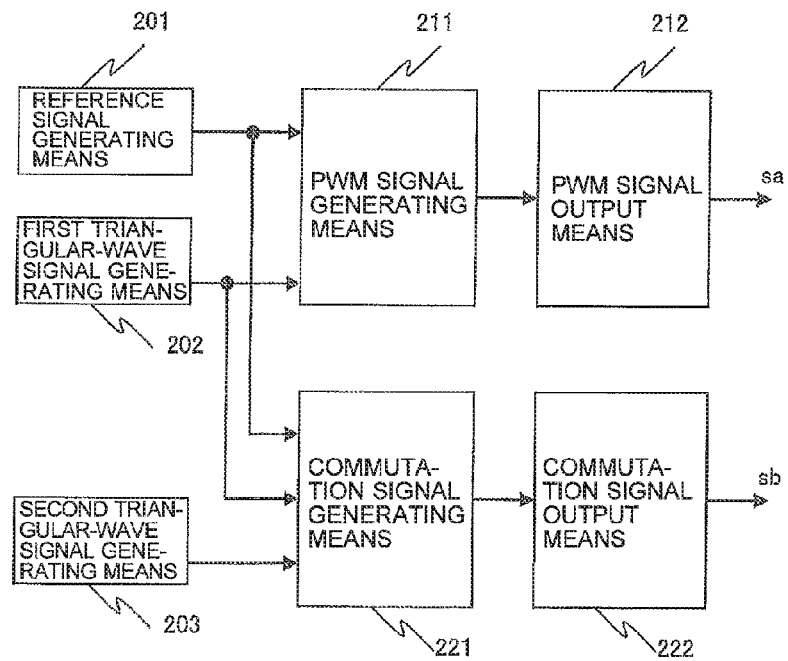

FIG. 6 includes diagrams explaining examples of generation of, for example, the driving signal sa by the control means 6. The example of FIG. 6(*a*) will now be described. FIG. 6(*a*) illustrates the configuration of means for achieving voltage varying control in the control means 6 on condition that the commutating means 4 is not allowed to perform the commutation operation (i.e., the commutating means 4 is eliminated or the commutation signal sb in the OFF state is output). In the configuration illustrated in FIG. 6(*a*), the control means 6 includes reference signal generating means 201, first triangular-wave signal generating means 202, PWM signal generating means 211, and PWM signal producing means 212.

Referring to FIG. 6(*a*), the reference signal generating means 201 generates a reference signal for generation of the driving signal sa. The reference signal generating means 201 corresponds to the above-described feedback controller 101 or the combination of the feedback controllers 101 and 102 in FIG. 5.

The first triangular-wave signal generating means 202 generates a first triangular-wave signal having, for example, a predetermined period and amplitude. The PWM signal generating means 211 compares the first triangular-wave signal generated by the first triangular-wave signal generating means 202 with the reference signal generated by the reference signal generating means 201 and generates a PWM signal on the basis of the relation in magnitude between the signals to determine whether the step-up switch 22 is turned on or off.

Figure 7:
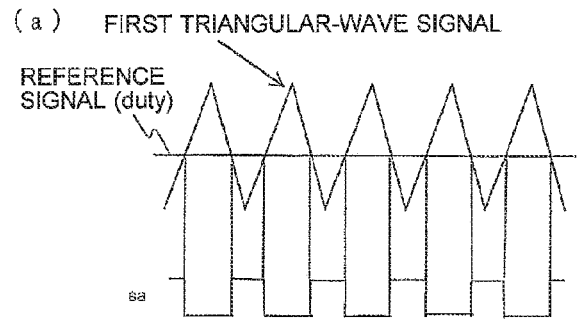
FIG. 7 includes diagrams explaining examples of PWM signal generation.
Figure 7:
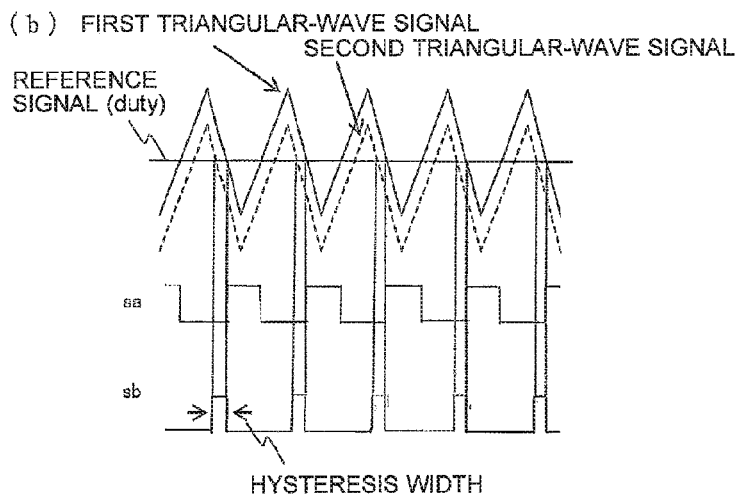
Figure 7:
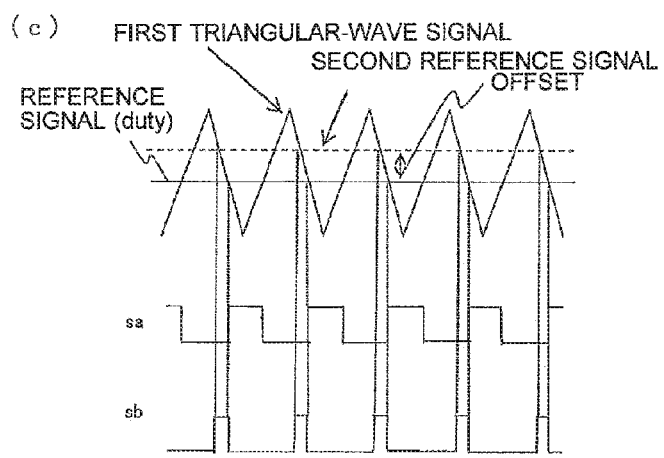

FIG. 7 includes diagrams explaining examples of PWM signal generation. The example of FIG. 7(*a*) will now be described. For example, the first triangular-wave signal generated by the first triangular-wave signal generating means 202 is compared with the reference signal generated by the reference signal generating means 201. If the reference signal is greater than the first triangular-wave signal, the driving signal sa is set to the high level (turned on). Whereas, if the reference signal is less than or equal to the first triangular-wave signal, the driving signal sa is set to a low level (turned off). In this case, a criterion indicating that the active direction or a threshold (threshold value) is on the high-level side may be changed as necessary.

The PWM signal producing means 212, which includes a PWM generator or the like, transmits the driving signal sa for operating the step-up switch 22 to the driving signal transfer means 7. The control means 6 controls the turn-on and -off (opening and closing) of the step-up switch 22 in the above-described manner.

As described above, the control means 6 generates the driving signal sa. The relation between the driving signal sa and flowing current will now be described with reference to FIGS. 1 and 4. The flow of the current $I_1$ through the reactor 21 splits at a point A in FIG. 1 into two flows, the current $I_2$ flowing through the step-up switch 22 and the current $I_3$ flowing through the step-up rectifier 23. This relation is given by the following Equation (2).

$$I_1 = I_2 + I_3 \quad (2)$$

When the step-up switch 22 is turned ON (closed) in accordance with the driving signal sa while the current flows forward through the step-up rectifier 23, the points A and D are electrically connected, so that a potential at the point B in FIG. 1 is substantially equal to that at the point D in FIG. 1. For example, in the case where the step-up switch 22 includes a device, such as an insulated gate bipolar transistor (IGBT) or a field-effect transistor (MOS), a turn-on voltage of the device is the difference in potential between the points B and D (the potential at the point B is substantially equal to a potential at the negative terminal of the power supply 1). A potential at the point C in FIG. 1 is substantially maintained in a charging potential state by the smoothing means 3. Accordingly, when the step-up switch 22 is closed, a reverse-bias voltage corresponding to the potential difference between the points C and B is applied to the step-up rectifier 23, so that the step-up rectifier 23 undergoes transition to an OFF state.

FIG. 8 is a diagram explaining the flow of recovery current. In the case where the step-up rectifier 23 includes a p-n junction diode, short-circuit current (hereafter, referred to as "recovery current") flows through a path as illustrated in FIG. 8 until the step-up rectifier 23 is reversely recovered (i.e., blocks reverse current). Consequently, circuit loss is increased due to the recovery current which tends to flow from the load 9 (smoothing means 3) side to the power supply 1 side. This current becomes a factor that displaces common-mode current. Thus, for example, a noise terminal voltage level and a radiation noise level rise. Accordingly, measures against noise entail high cost. Furthermore, a noise filter (not illustrated) increases in size, so that the flexibility of installation space is restricted.

Typical rectifiers have such a tendency that the amount of accumulated carriers increases with increasing current capacity. As the current capacity increases, therefore, the recovery current also increases due to reverse recovery delay, for example. In addition, as an applied reverse-bias voltage increases, the recovery current also increases.

According to Embodiment 1, instead of reverse recovery by application of a high reverse-bias voltage to the step-up rectifier 23 having a large current capacity, a second path for commutation is provided and control (hereinafter, referred to as "commutation control") is performed such that a low reverse-bias voltage is applied to the step-up rectifier 23 through the transformer 41 and the commutation rectifier 42 in the commutating means 4 to achieve reverse recovery just before turn-on (closing) of the step-up switch 22, and the step-up switch 22 is then turned on.

Accordingly, the commutation signal sb for the commutating means 4 is turned on just before turn-on of the driving signal sa so that current flowing through the step-up rectifier 23 through the transformer 41 is commutated to the commutation rectifier 42.

As regards the reference signal for generation of the driving signal sa, for example, the PI control and the like is performed by the feedback controllers 101 and 102 (the reference signal generating means 201) as described above to set the ON period of the driving signal sa, regardless of whether the commutation control is performed (refer to FIGS. 5(a) and (b)).

Figure 9:
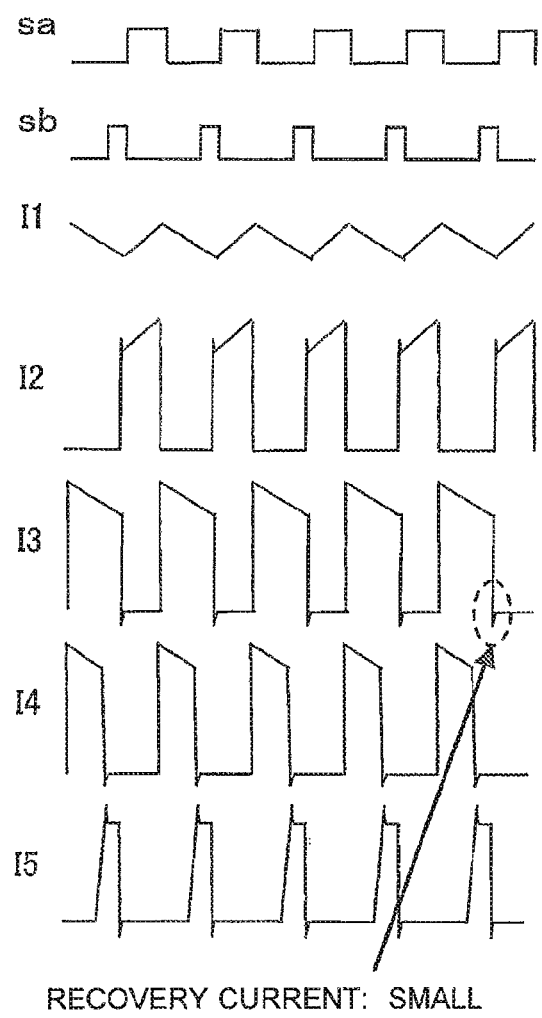
FIG. 9 is a diagram illustrating waveforms of signals and currents in a case where the commutating means 4 is operated.

FIG. 9 is a diagram illustrating waveforms of the driving signal sa, the commutation signal sb, and currents $I_1$ to $I_5$ in the case where the commutating means 4 is operated (the commutation signal sb is transmitted). In this case, the commutation signal sb is a PWM signal and the direction to the high level is the active direction (turn-on direction). The illustrated examples of the current waveforms are obtained after a lapse of sufficient time, during which the ON period and the OFF period of the driving signal sa are controlled so that the load 9 provides a constant output, from the time when the power supply 1 is turned on. The duty ratio of the driving signal sa exhibits a substantially constant value. The currents $I_1$ to $I_3$ represent the currents flowing through the same components as those described above with reference to FIG. 3.

The flow of the current $I_3$ splits at the point B into two flows, the current $I_4$ flowing through the step-up rectifier 23 and the current $I_5$ flowing through the secondary winding of the transformer 41 and the commutation rectifier 42, as given by the following Equation (3).

$$I_3 = I_4 + I_5 \quad (3)$$

The example of FIG. 6(b) will now be described. FIG. 6(b) illustrates the configuration of means for achieving voltage variable control in the control means 6 on condition that the commutating means 4 is allowed to perform the commutation operation (i.e., the commutation signal sb is transmitted). In the configuration illustrated in FIG. 6(b), the control means 6 includes the reference signal generating means 201, the first triangular-wave signal generating means 202, the PWM signal generating means 211, and the PWM signal producing means 212 which are the same in FIG. 6(a). In the configuration of FIG. 6(b), the control means 6 further includes second triangular-wave signal generating means 203, commutation signal generating means 221, and commutation signal producing means 222.

The second triangular-wave signal generating means 203 generates a second triangular-wave signal having a predetermined hysteresis width relative to the first triangular-wave signal generated by the first triangular-wave signal generating means 202.

The commutation signal generating means 221 compares the first triangular-wave signal generated by the first triangular-wave signal generating means 202, the second triangular-wave signal generated by the second triangular-wave signal generating means 203, and the reference signal generated by the reference signal generating means 201 to generate the commutation signal sb.

Subsequently, generation of the commutation signal sb based on the comparison of the three signals will now be described with reference to FIG. 7(b). For example, during falling periods (latter half periods) of the first and second triangular-wave signals, when the second triangular-wave signal and the reference signal reach the same value and the first triangular-wave signal is greater than the reference signal, the commutation signal sb is turned on (the commutation switch is thus closed). Whereas, when the first triangular-wave signal and the reference signal reach the same value and the second triangular-wave signal is less than the reference signal, the commutation signal sb is turned off (the commutation switch is thus opened).

In this case, the first triangular-wave signal, the second triangular-wave signal, and the reference signal satisfy the above-described relation, thus switching between turn-on and turn-off of the commutation signal sb. For example, the turn-on time of the commutating means 4 (the time when the commutation operation is started) may be set in consideration of, for example, delay time during which output of the commutation signal sb causes the transformer 41 to be driven to start commutation to the commutation rectifier 42. Furthermore, the turn-off time of the commutating means may be set in consideration of, for example, delay time of the transformer driving circuit 43, reverse recovery time (typically, several hundreds of nanoseconds to several microseconds) of the step-up rectifier 23, and reverse recovery time (typically, several nanoseconds to several hundreds of nanoseconds) of the commutation rectifier 42 such that the commutation operation is stopped within a predetermined period including the time when the step-up switch 22 is turned on. In this case, control may be performed in accordance with the turn-on or turn-off times of the driving signal sa and the commutation signal sb. Alternatively, for example, the driving signal transfer means 7 or the commutation signal transfer means 8 may include a delay circuit for providing predetermined delay time for time control. Furthermore, for example, the active direction of the signals may be changed as necessary. As regards determination about period, namely, whether it is the falling period (latter half period) of a triangular-wave signal may be determined using, for example, a timer for triangular-wave signal generation. For example, whether it is the former half or latter half period may be periodically determined. Furthermore, the determination may be made in accordance with determination that it is the turn-on or turn-off time of a triangular-wave signal based on time management (counted elapsed time) of the signal.

Although the commutation signal sb is generated on the basis of the first and second triangular-wave signals and the reference signal, generation is not limited to this case. For example, as illustrated in FIG. 7(c), a second reference signal can be generated such that the second reference signal has an offset relative to the reference signal, the offset corresponding to the amount of hysteresis between the first and second triangular-wave signals. The commutation signal sb can be generated on the basis of the two reference signals and the first triangular-wave signal.

The commutation signal producing means 222, which includes a PWM generator, transmits the commutation signal sb for operating the commutation switch 44 to the commutation signal transfer means 8. The control means 6 controls opening and closing of the commutation switch 44 in the above-described manner.

As described above, the control means 6 generates the commutation signal sb. The relation between the driving signal sa, the commutation signal sb, and flowing current will now be described with reference to FIGS. 1 and 9. When the commutation signal sb is turned on just before turn-on of the driving signal sa (i.e., turn-on of the step-up switch 22), exciting current causes current to start flowing through the secondary winding of the transformer 41. Consequently, the current starts flowing such that the current splits into two flows, the one current flowing to the step-up rectifier 23, the other current flowing to the commutation rectifier 42 (second path). After that, while the commutation signal sb is held in the ON state, the current flowing to the step-up rectifier 23 becomes less, so that the entire current flows to the commutation rectifier 42 (completion of commutation).

In this case, an applied voltage related to the transformer power supply 45 is set to a sufficiently lower voltage than an output voltage (for example, a potential between the points C and D) of the step-up means 2. Thus, the step-up rectifier 23 can be turned off (reversely recovered) at a low reverse-bias voltage.

Then, the driving signal sa is turned on in this state. At this time, a reverse recovery operation is performed in the commutation rectifier 42. In this case, recovery current is generated. Since conduction time in the reverse recovery for the commutation rectifier 42 is significantly short as compared with that for the step-up rectifier 23, however, an effective current necessary for the commutation rectifier 42 is very small. Advantageously, a small current capacity device with a small amount of accumulated carriers can be used and the recovery current can be reduced as compared with that for the step-up rectifier 23 (on condition that the device is selected in consideration of a peak current).

In the system according to Embodiment 1, accordingly, the power converter includes the commutating means 4, current flowing through the step-up means 2 is commutated through the second path to the smoothing means 3 such that, for example, the step-up rectifier 23 is reversely recovered before turn-on of the step-up switch 22. Therefore recovery current flowing due to turn-on of the step-up switch 22 is allowed to flow through the commutation rectifier 42 which requires a short time until reverse recovery, namely, has good recovery characteristics, instead of the step-up rectifier 23 with a low forward voltage which a large recovery current flows through. Thus, recovery current in the power converter can be reduced. While the commutation operation is not performed (normal state), current flows through the step-up rectifier 23 with a low forward voltage, so that operating loss in power conversion through the step-up means 2 can be reduced. Accordingly, if a large current capacity device is used as the step-up rectifier 23, recovery loss and conduction loss can be reduced, regardless of the current capacity of the device in the step-up means 2 and the recovery characteristics of the device. Consequently, although the commutation operation of the commutating means 4 is needed, loss caused by recovery current and the amount of noise can be reduced in the entire system.

In addition, circuit loss can be reduced and the noise terminal voltage level and the radiation noise level are reduced. Thus, the noise filter can be miniaturized, so that the cost can be reduced. These are effective as EMC measures.

In addition, since either one of the driving power supply (gate driving power supply) for operating the step-up switch 22 and the power supply for allowing the control means 6 to perform processing is used as the transformer power supply 45, it is unnecessary to provide a new power supply. Thus, an increase in cost can be prevented.

Since a wide gap band semiconductor is used for the commutation rectifier 42, the power converter with low loss can be provided. In addition, since the wide gap band semiconductor exhibits small power loss, a device with high efficiency can be achieved. The wide gap band semiconductor has a high allowable current density which facilitates miniaturization of a device. Accordingly, means including the device can also be miniaturized. The wide gap band semiconductor may be used for not only the commutation rectifier 42 but also another device, such as the commutation switch 44, so long as the use does not influence over loss in the entire system.

In this case, the commutation rectifier 42 may include a high-voltage-withstanding Schottky barrier diode with low loss and low forward voltage instead of the wide gap band semiconductor. As the designed allowable current effective value of such a device is higher, crystal defects and the cost may be increased. In the power converter (system) according to Embodiment 1, since current flows through the second path for a short time, the rectifier in the commutating means may include a device with a small allowable current effective value (i.e., a small current capacity), thus providing the power converter with high cost performance and high efficiency.

Furthermore, since the step-up means 2, the secondary winding of the transformer 41, and the commutation rectifier 42 can be insulated through the transformer 41 from the transformer driving circuit 43, the control means 6, and the commutation signal sb, the commutation signal sb (commutation signal SB) can be relatively easily transmitted. The means to which a high voltage is applied can be electrically separated from the means which operates at a low voltage. Additionally, the system with high safety and high reliability can be made. In Embodiment 1, the transformer 41 and the transformer driving circuit 43 constitute the commutation operation means. The configuration of this means may be modified so long as components can achieve the commutation operation for commutating current to a second path, though the modified means may fail to provide the same advantages as those described above.

Embodiment 2

Figure 10:
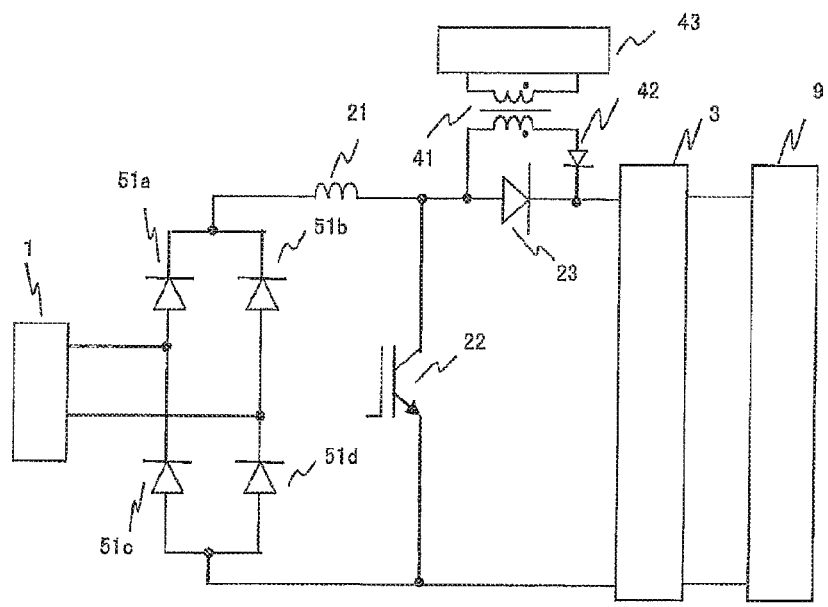
FIG. 10 is a diagram illustrating a system on which a power converter according to Embodiment 2 is centered.

FIG. 10 is a diagram illustrating the configuration of a system on which a power converter according to Embodiment 1 of the present invention is centered. The configuration of the system including an apparatus capable of achieving high efficiency power conversion in a manner similar to that in FIG. 1 will be described.

The system of FIG. 10 differs from that according to Embodiment 1 (FIG. 1, for example) in that a power supply 1 is an alternating-current power supply (single-phase) and the system further includes rectifiers 51a to 51d. The rectifiers 51a to 51d, such as diodes, constitute a diode bridge to rectify current (power) supplied from the power supply 1 (alternating current).

Figure 11:
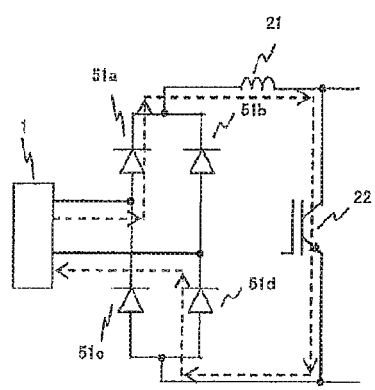
FIG. 11 includes diagrams illustrating the system on which the power converter according to Embodiment 2 is centered.
Figure 11:
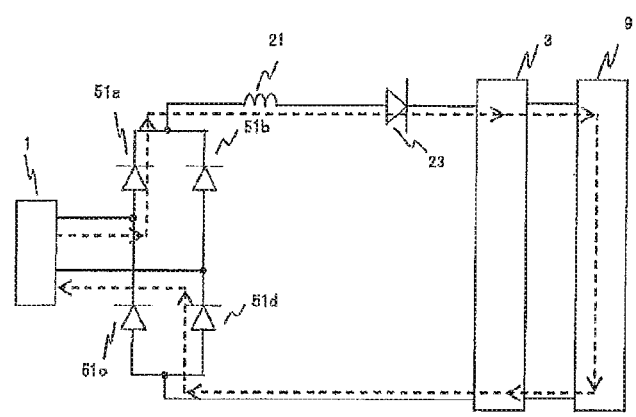
Figure 11:
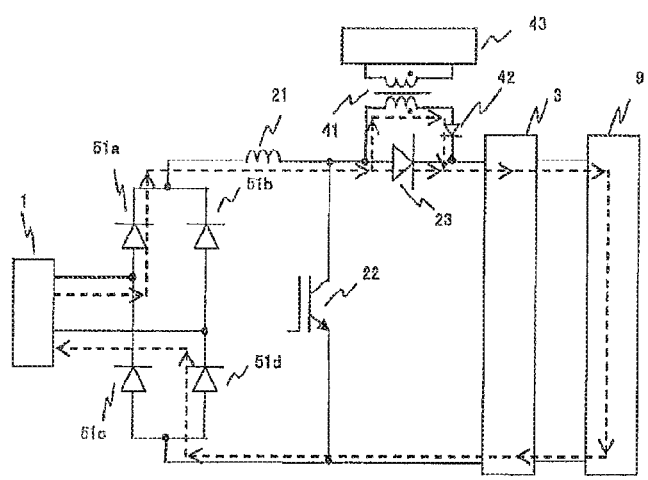

FIG. 11 includes diagrams illustrating current flows related to typical operations of the system according to Embodiment 2. FIG. 11(a) illustrates a case where current flows through the rectifiers 51a and 51d and a step-up switch 22. In this case, the step-up switch 22 is in the ON state and a transformer driving circuit 43 is not driven (a transformer 41 does not operate).

FIG. 11(b) illustrates a case were current flows through the rectifiers 51a and 51d and a step-up rectifier 23. In this case, the step-up switch 22 is in the OFF state and the transformer driving circuit 43 is not driven.

FIG. 11(c) illustrates a case where current flows through the rectifiers 51a and 51d, the step-up rectifier 23, and a commutation rectifier 42. In this case, the step-up switch 22 is in the OFF state and the transformer driving circuit 43 is driven.

The transformer driving circuit 43 is driven for commutation control as illustrated in FIG. 11(c) just before transition from the state of FIG. 11(b) (where the step-up switch 22 is in the OFF state) to the state of FIG. 11(a) (i.e., just before turn-on of the step-up switch 22), so that recovery current can be reduced.

In the case where current flows through the rectifiers 51b and 51c, similarly, the transformer driving circuit 43 is driven for commutation control just before turn-on of the step-up switch 22, so that recovery current can be reduced, for example.

As described above, in the case where the power supply 1 is the single-phase alternating-current power supply, the same advantages as those of Embodiment 1 can be achieved.

Although the case where the power supply 1 is the single-phase alternating-current power supply and the power converter includes the step-up switch 22 (voltage varying switch) for varying a voltage is positioned on a direct-current side (closer to the load 9 than the rectifiers 51a to 51d) has been described above as an example, Embodiment 2 can be applied to a power converter with another configuration. For example, the power converter may be configured such that the step-up switch 22 (voltage varying switch) is positioned on an alternating-current side (closer to the power supply 1 than the rectifiers 51a to 51d). Furthermore, Embodiment 2 can be applied to a power converter that converts power supplied from a three-phase alternating-current power supply, serving as the power supply 1.

Embodiment 3

Although Embodiments 1 and 2 have been described with respect to the power converters in each of which the step-up means 2 is a target of commutation by the commutating means 4 and power conversion for increasing a voltage applied by the power supply 1 is performed, the present invention is not limited to this case. The above-described advantages can be achieved in a power converter that includes voltage varying means, such as step-down means or step-up/down means, capable of varying a voltage, instead of the step-up means 2.

Embodiment 4

Figure 12:
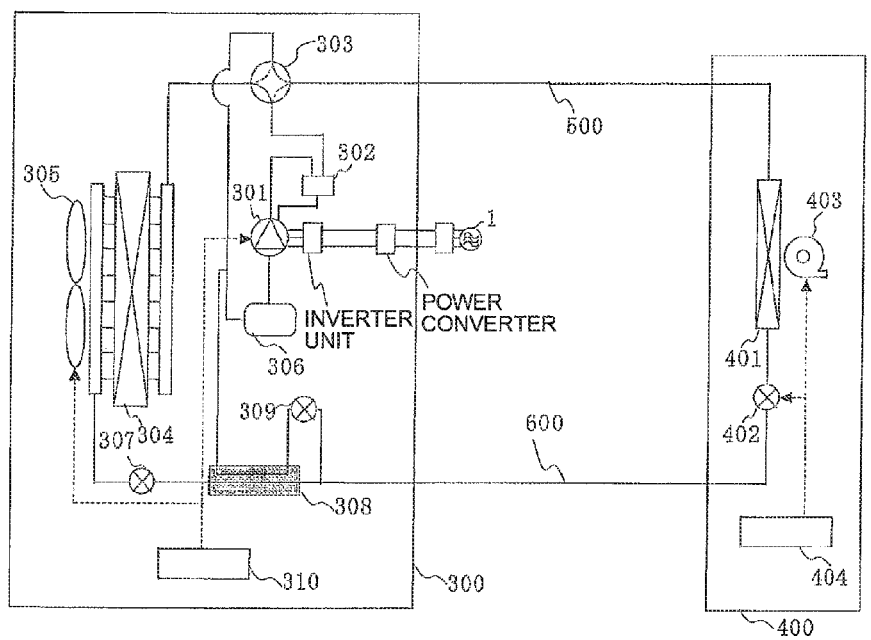
FIG. 12 is a schematic diagram of a refrigerating and air-conditioning apparatus according to Embodiment 4 of the present invention.

FIG. 12 is a schematic diagram of a refrigerating and air-conditioning apparatus according to Embodiment 4 of the present invention. Embodiment 4 will be described with respect to the refrigerating and air-conditioning apparatus as an example of a refrigeration cycle apparatus including the power converter in any of Embodiments 1 to 3. The refrigerating and air-conditioning apparatus of FIG. 12 includes a heat source side unit (outdoor unit) 300 and a load side unit (indoor unit) 400 connected to each other by refrigerant pipes to constitute a main refrigerant circuit (hereinafter, referred to as the "main refrigerant circuit") through which a refrigerant is circulated. The refrigerant pipes includes a gas pipe 500 through which a gaseous refrigerant (gas refrigerant) flows and a liquid pipe 600 through which a liquid refrigerant (liquid refrigerant including a two-phase gas-liquid refrigerant) flows.

In Embodiment 4, the heat source side unit 300 includes a plurality of devices (means), namely, a compressor 301, an oil separator 302, a four-way valve 303, a heat source side heat exchanger 304, a heat source side fan 305, an accumulator 306, a heat source side expansion device (expansion valve) 307, a heat exchanger related to refrigerant 308, a bypass expansion device 309, and a heat source side control device 310.

The compressor 301 sucks the refrigerant, compresses it, and discharges the resultant refrigerant. The compressor 301 is provided with an inverter unit, for example, and varies a driving frequency to any value such that the capacity (amount of refrigerant passing through per unit time) of the compressor 301 can be varied finely. For example, the power converter in any of Embodiments 1 to 3 is placed between a power supply 1 which supplies power for driving the compressor 301 (motor) and a load 9 which includes the inverter unit and the compressor 301.

The oil separator 302 is configured to separate lubricating oil discharged from the compressor 301 while being mixed with the refrigerant. The separated lubricating oil is returned to the compressor 301. The four-way valve 303 switches between a direction of flow of the refrigerant in a cooling operation and a direction of flow of the refrigerant in a heating operation in accordance with an instruction from the heat source side control device 310. The heat source side heat exchanger 304 exchanges heat between the refrigerant and air (outdoor air). For example, the heat source side heat exchanger 304 functions as an evaporator in the heating operation, exchanges heat between a low-pressure refrigerant supplied through the heat source side expansion device 307 and the air such that the refrigerant evaporates and gasifies. The heat source side heat exchanger 304 functions as a condenser in the cooling operation, exchanges heat between the refrigerant, which has been compressed by the compressor 301, supplied from the four-way valve 303 and the air such that the refrigerant condenses and liquefies. The heat source side heat exchanger 304 is provided with the heat source side fan 305 in order to exchange heat between the refrigerant and the air with high efficiency. The heat source side fan 305 may also be supplied with power through the power converter described in Embodiment 1. For example, the inverter unit, serving as the load 9, may suitably vary a driving frequency for a fan motor to any value such that a rotation speed of the fan is varied finely.

The heat exchanger related to refrigerant 308 exchanges heat between the refrigerant flowing through a main passage in the refrigerant circuit and a refrigerant, whose flow rate has been controlled by the bypass expansion device 309 (expansion valve), flowing through a passage branching off from the main passage. In the case where it is necessary to subcool the refrigerant, particularly in the cooling operation, the heat exchanger related to refrigerant 308 subcools the refrigerant and supplies the resultant refrigerant to the load side unit 400. The liquid flowing through the bypass expansion device 309 is returned through a bypass pipe to the accumulator 306. The accumulator 306 is means for storing, for example, an excess of liquid refrigerant. The heat source side control device 310 includes a microcomputer and the like. The heat source side control device 310 can communicate with a load side control device 404 by wire or radio and controls the means related to the refrigerating and air-conditioning apparatus, for example, controls an inverter circuit to control the driving frequency of the compressor 301 on the basis of, for example, data related to detection by various detecting means (sensors) in the refrigerating and air-conditioning apparatus, thus controlling an operation of the entire refrigerating and air-conditioning apparatus. Furthermore, the heat source side control device 310 may perform processing executed by the control means 6 described in Embodiments 1 to 3.

The load side unit 400 includes a load side heat exchanger 401, a load side expansion device (expansion valve) 402, a load side fan 403, and the load side control device 404. The load side heat exchanger 401 exchanges heat between the refrigerant and air. For example, the load side heat exchanger 401 functions as a condenser in the heating operation, exchanges heat between the refrigerant supplied through the gas pipe 500 and the air such that the refrigerant condenses and liquefies (or turns into a two-phase gas-liquid state), and allows the resultant refrigerant to flow toward the liquid pipe 600. Whereas, the load side heat exchanger 401 functions as an evaporator in the cooling operation, exchanges heat between the refrigerant in a low-pressure state, processed by the load side expansion device 402, and the air such that the refrigerant evaporates and gasifies while removing heat from the air, and allows the resultant refrigerant to flow toward the gas pipe 500. The load side unit 400 is provided with the load side fan 403 for controlling the flow of air for heat exchange. A driving speed of the load side fan 403 is determined by user setting, for example. The load side expansion device 402 is provided to control a pressure of the refrigerant in the load side heat exchanger 401 by changing its opening degree.

The load side control device 404 also includes a microcomputer and the like and can communicate with, for example, the heat source side control device 310 by wire or radio. The load side control device 404 controls devices (means) in the load side unit 400 in accordance with an instruction from the heat source side control device 310 or an instruction from an occupier or the like such that, for example, a room is at a predetermined temperature. Additionally, the load side control device 404 transmits a signal including data related to detection by the detecting means arranged in the load side unit 400.

As described above, in the refrigerating and air-conditioning apparatus according to Embodiment 4, power is supplied to, for example, the compressor 301, and the heat source side fan 305 using the power converter according to any of Embodiments 1 to 3. Advantageously, the refrigerating and air-conditioning apparatus with high efficiency and high reliability can be provided.

INDUSTRIAL APPLICABILITY

Although Embodiment 4 has been described with respect to the case where the power converter according to the present invention is applied to the refrigerating and air-conditioning apparatus, the present invention is not limited to this case. The present invention can be applied to an apparatus, such as a heat pump apparatus or a refrigerator, using a refrigeration cycle (heat pump cycle), a conveying apparatus, such as an elevator, and a lighting apparatus (system).

The invention claimed is:

1. A power converter comprising:
   voltage varying means for varying an applied voltage to a predetermined voltage, the voltage varying means including a voltage varying rectifier;
   commutating means for performing a commutation operation for allowing a current flowing through the voltage varying means to flow through a second path, and including a commutation switch for controlling the commutation operation by being opened and closed;
   smoothing means for smoothing a voltage related to outputs of the voltage varying means and the commutating means to produce power and supplying the power to a load side; and
   a controller configured to control voltage varying by the voltage varying means and to control the commutation operation of the commutating means on the basis of at least one of a voltage and a current related to the voltage varying means before a recovery current from the smoothing means side to the voltage varying means is generated in the voltage varying rectifier, and to control opening and closing of the commutation switch, wherein the controller further including
      reference signal generating means for generating a reference signal as a reference for generation of a PWM signal on the basis of at least one of the voltage and the current related to the voltage varying means;
      first triangular-wave signal generating means for generating a first triangular-wave signal;
      second triangular-wave signal generating means for generating a second triangular-wave signal;
      commutation signal generating means for generating a commutation signal on the basis of the reference signal, the first triangular-wave signal, and the second triangular-wave signal; and
      commutation signal producing means for transmitting the commutation signal.

2. The power converter of claim 1, wherein the voltage varying means includes a reactor, and a voltage varying switch that is opened or closed to allow the reactor to discharge or charge power.

3. The power converter of claim 2,
wherein the controller allows the commutating means to start the commutation operation before closing of the voltage varying switch.

4. The power converter of claim 2,
wherein the controller allows the commutating means to terminate the commutation operation within a predetermined period including the time when the voltage varying switch is closed.

5. The power converter of claim 2, wherein the controller includes:
PWM signal generating means for generating the PWM signal on the basis of the reference signal and the first triangular-wave signal; and
PWM signal producing means for transmitting the PWM signal.

6. The power converter of claim 1,
wherein the commutating means includes:
commutation operation means for performing the commutation operation in accordance with an instruction from the controller; and
a commutation rectifier that rectifies a current related to commutation from the voltage varying means.

7. The power converter of claim 6,
wherein the commutation operation means includes:
a transformer that allows a secondary winding on the second path to be applied with a voltage on the basis of a voltage applied to a primary winding such that the commutation operation is performed; and
a transformer driving device that controls application of the voltage to the primary winding of the transformer in accordance with an instruction from the controller.

8. The power converter of claim 7, wherein a voltage applied to the transformer is lower than an output voltage of the voltage varying means.

9. The power converter of claim 6,
wherein the commutation rectifier is a device using a wide band gap semiconductor.

10. The power converter of claim 9, wherein the wide band gap semiconductor includes silicon carbide, a gallium nitride material, or diamond.

11. The power converter of claim 1, wherein a power supply for allowing the commutating means to perform the commutation operation is used as a power supply for allowing the voltage varying means to perform a voltage varying operation.

12. The power converter of claim 1, wherein a power supply for allowing the commutating means to perform the commutation operation is used as a power supply for operating the controller.

13. A refrigerating and air-conditioning apparatus comprising:
the power converter of claim 1, the power converter being used to drive at least one of a compressor and an air-sending device.

14. A power converter comprising:
voltage varying means for varying an applied voltage to a predetermined voltage, the voltage varying means including a voltage varying rectifier;
commutating means for performing a commutation operation for allowing a current flowing through the voltage varying means to flow through a second path, and including a commutation switch for controlling the commutation operation by being opened and closed;
smoothing means for smoothing a voltage related to outputs of the voltage varying means and the commutating means to produce power and supplying the power to a load side;
a first controller configured to control voltage varying by the voltage varying means on the basis of at least one of a voltage and a current related to the voltage varying means; and
a second controller configured to control the commutation operation of the commutating means on the basis of at least one of the voltage and the current related to the voltage varying means before a recovery current from the smoothing means side to the voltage varying means is generated in the voltage varying rectifier, and to control opening and closing of the commutation switch,
wherein the controller further including
reference signal generating means for generating a reference signal as a reference for generation of a PWM signal on the basis of at least one of the voltage and the current related to the voltage varying means;
first triangular-wave signal generating means for generating a first triangular-wave signal;
second triangular-wave signal generating means for generating a second triangular-wave signal;
commutation signal generating means for generating a commutation signal on the basis of the reference signal, the first triangular-wave signal, and the second triangular-wave signal; and
commutation signal producing means for transmitting the commutation signal.

15. The power converter of claim 14,
wherein the voltage varying means includes a reactor, and a voltage varying switch that is opened or closed to allow the reactor to discharge or charge power.

16. The power converter of claim 14,
wherein the commutating means includes:
commutation operation means for performing the commutation operation in accordance with an instruction from the controller; and
a commutation rectifier that rectifies a current related to commutation from the voltage varying means.

17. A power converter comprising:
voltage varying means for varying an applied voltage to a predetermined voltage, the voltage varying means including a voltage varying rectifier;
commutating means for performing a commutation operation for allowing a current flowing through the voltage varying means to flow through a second path, and including a commutation switch for controlling the commutation operation by being opened and closed;
smoothing means for smoothing a voltage related to outputs of the voltage varying means and the commutating means to produce power and supplying the power to a load side; and
a controller configured to control voltage varying by the voltage varying means and to control the commutation operation of the commutating means on the basis of at least one of a voltage and a current related to the voltage varying means before a recovery current from the smoothing means side to the voltage varying means is generated in the voltage varying rectifier, and to control opening and closing of the commutation switch,
wherein the controller includes:
reference signal generating means for generating a first reference signal as a reference for generation of a commutation signal which is a PWM signal and a second reference signal having a predetermined offset relative to the first reference signal on the basis of at least one of the voltage and the current related to the voltage varying means, first triangular-wave signal generating means for generating a first triangular-wave signal, commutation signal generating means for generating a commutation signal on the basis of the first reference signal, the second reference signal, and the first triangular-wave signal, and commutation signal producing means for transmitting the commutation signal.

* * * * *